(12) United States Patent
Ohmi et al.

(10) Patent No.: US 6,170,890 B1
(45) Date of Patent: Jan. 9, 2001

(54) PIPE JOINT

(75) Inventors: Tadahiro Ohmi, 2-1-17-301, Komegafukuro, Aoba-ku, Sendai-shi, Miyagi; Michio Yamaji, Osaka; Nobukazu Ikeda, Osaka; Tsutomu Shinohara, Osaka; Tetsuya Kojima, Osaka, all of (JP)

(73) Assignees: Tadahiro Ohmi, Sendai; Fujikin Incorporated, Osaka, both of (JP)

( * ) Notice: Under 35 U.S.C. 154(b), the term of this patent shall be extended for 0 days.

(21) Appl. No.: 09/096,494

(22) Filed: Jun. 12, 1998

(30) Foreign Application Priority Data

Jun. 18, 1997 (JP) .................................................. 9-161047

(51) Int. Cl.⁷ ...................................................... F16L 17/00
(52) U.S. Cl. ............................ 285/379; 285/328; 285/917
(58) Field of Search .................................. 285/379, 328, 285/917

(56) References Cited

U.S. PATENT DOCUMENTS

| 1,537,755 | * | 5/1925 | Dowling ........................... 285/917 X |
| 1,595,310 | * | 8/1926 | Mueller et al. ...................... 285/328 |
| 1,715,854 | * | 6/1929 | McKenzie-Martyn ........... 285/917 X |
| 4,838,583 | * | 6/1989 | Babuder et al. .................. 385/379 X |
| 5,340,170 | * | 8/1994 | Shinohara et al. ................... 385/379 |
| 5,409,270 | * | 4/1995 | Shinohara et al. ................... 285/379 |
| 5,720,505 | * | 2/1998 | Ohmi et al. .......................... 285/328 |
| 5,887,876 | * | 3/1999 | Aldridge et al. ................. 285/328 X |

FOREIGN PATENT DOCUMENTS

| 0 758 067 A1 | 2/1997 | (EP) . |
| 0 837 278 | 4/1998 | (EP) . |
| 2 038 972 | 7/1980 | (GB) . |
| 6011079 | * | 1/1994 | (JP) ...................................... 285/379 |
| 9-032984 | 2/1997 | (JP) . |

OTHER PUBLICATIONS

Patent Abstracts of Japan, vol. 097, No. 006, Jun. 30, 1997.

\* cited by examiner

*Primary Examiner*—Lynne H. Browne
*Assistant Examiner*—David E. Bochna
(74) *Attorney, Agent, or Firm*—Armstrong, Westerman, Hattori, McLeland & Naughton

(57) ABSTRACT

Each of seal projections 7, 8 is positioned radially outward of an inner periphery 1a, 2a of abutting end face of each of joint members 7, 8 and has in section a contour which comprises a circular-arc portion 7b, 8b extending radially outward from the abutting end face, and a straight portion 7a, 8a extending from the circular-arc portion 7b, 8b. The circular-arc portion 7b, 8b has a center positioned radially inward of the point of intersection of the circular-arc portion 7b, 8b and the straight portion 7a, 8a. The straight portion 7a, 8a is inclined at 30 to 60 degrees with respect to the direction of axis of the joint member.

4 Claims, 5 Drawing Sheets

PIPE JOINT

BACKGROUND OF THE INVENTION

The present invention relates to pipe joints, and more particularly to pipe joints suitable, for example, for use in manufacturing semiconductors of which extremely high cleanliness is required.

The present inventor has already proposed a pipe joint suited, for example, to use in fabricating semiconductors of which extremely high cleanliness is required. With reference to FIG. 6, the proposed pipe joint comprises a pair of tubular joint members 1, 2, an annular gasket 3 interposed between abutting end faces of the joint members 1, 2 and threaded means for joining the joint members 1, 2, the abutting end faces of the joint members 1, 2 being formed with annular seal projections 37, 38 respectively, so that when the threaded means is completely tightened up, recesses corresponding to the respective seal projections 37, 38 are created in end faces of the gasket 3, with respective inner peripheries 1a, 2a of the abutting end faces of the joint members 1, 2 becoming approximately flush with an inner periphery 3a of the gasket 3. The pipe joint is characterized in that each of the seal projections 37, 38 has a sectional contour which comprises a circular-arc portion 37b (38b) extending radially outward from the abutting end face, and a straight portion 37a (38a) extending from the circular-arc portion 37b (38b) (see JP-A-32984/1997). Referring to the same drawing, the abutting end faces have respective inner flat portions 15, 16 formed inwardly of the seal projections 37, 38, and respective outer flat portions 17, 18 positioned outwardly of the projections 37, 38. Indicated at 9 and 10 are overtightening preventing annular ridges formed at the outer peripheries of the respective abutting end faces.

The pipe joint described has no liquid trapping cavity, is unlikely to develop in the inner periphery of the gasket creases which would permit deposition of dirt and further enables the worker, while tightening the threaded member, to perceive an altered reaction which indicates the completion of tightening. Thus, the pipe joint has features suitable for use in manufacturing semiconductors. However, the joint has the following problem. While such pipe joints as assembled once are frequently disassembled and assembled again, the joint shown in FIG. 6 has the drawback that the gasket 3 is difficult to remove from the joint members 1, 2 for disassembly because when the gasket 3 is to be moved axially relative to the first and second joint members 1, 2, the straight portions 37a, 38a of the seal projections 37, 38 biting in the gasket 3 give increased friction against the movement of the gasket.

SUMMARY OF THE INVENTION

An object of the present invention is to provide a pipe joint which is easy to disassemble and assemble again and which nevertheless has no liquid trapping cavity, is unlikely to develop any dirt accumulating creases in the inner periphery of its gasket and is adapted to notify completion of tightening by an altered reaction, the pipe joint thus having features suitable for use in fabricating semiconductors.

The present invention provides a pipe joint comprising a pair of tubular joint members, an annular gasket interposed between abutting end faces of the joint members and threaded means for joining the joint members, the abutting end face of each the joint members being formed with an annular seal projection, so that when the threaded means is completely tightened up, a recess corresponding to the seal projection is created in the end face of the gasket opposed thereto, with the inner periphery of the abutting end face of each joint member becoming approximately flush with an inner periphery the gasket, the pipe joint being characterized in that the seal projection is positioned radially outward of the inner periphery of the abutting end face of the joint member and has in section a contour which comprises a circular-arc portion extending radially outward from the abutting end face, and a straight portion extending from the circular-arc portion, the circular-arc portion having a center positioned radially inward of the point of intersection of the circular-arc portion and the straight portion, the straight portion being inclined at 30 to 60 degrees with respect to the direction of axis of the joint.

As the threaded means is tightened, the seal projections of the joint members come into intimate contact with the respective end faces of the gasket, opposed thereto, and the inner peripheral portion of the abutting end face of each joint member then comes into intimate contact with the inner peripheral portion of the gasket end face opposed thereto, producing a sealing effect and eliminating any liquid trapping cavity. Although the gasket deforms most greatly at the position where each seal projection is located, this position is not the inner periphery of the gasket end face but is outward of the inner periphery, so that the gasket portion deforming most greatly is outward of the inner peripheral portion. Consequently no crease is formed in the inner periphery of the gasket, obviating the likelihood of dirt collecting in creases. If the straight portion included in the contour of the projection extends axially of the joint, there arises the problem that the gasket is difficult to remove when the pipe joint is to be disassembled, whereas the straight portion, which is inclined, obviates this problem. Moreover, the projection permits the worker to perceive an altered reaction more easily than when it is wholly in the form of a circular arc. Thus, the projection has an advantage of a projection which is entirely in the form of a circular arc and that of a projection which has an axial straight portion.

If the inclination is smaller than 30 degrees, the projection will have the drawback of rendering the gasket difficult to remove, i.e., the problem attributable to the presence of the axial straight portion, while if the inclination is greater than 60 degrees, there arises a problem attributable to the projection which is arcuate in its entirety, i.e., the drawback that an altered reaction is difficult to perceive. Accordingly, the inclination is preferably 30 to 60 degrees, more preferably about 45 degrees.

DESCRIPTION OF THE PREFERRED EMBODIMENT

An embodiment of the invention will be described below with reference to the drawings. In the following description, the terms "left" and "right" are used based on FIG. 1.

Figure 1:
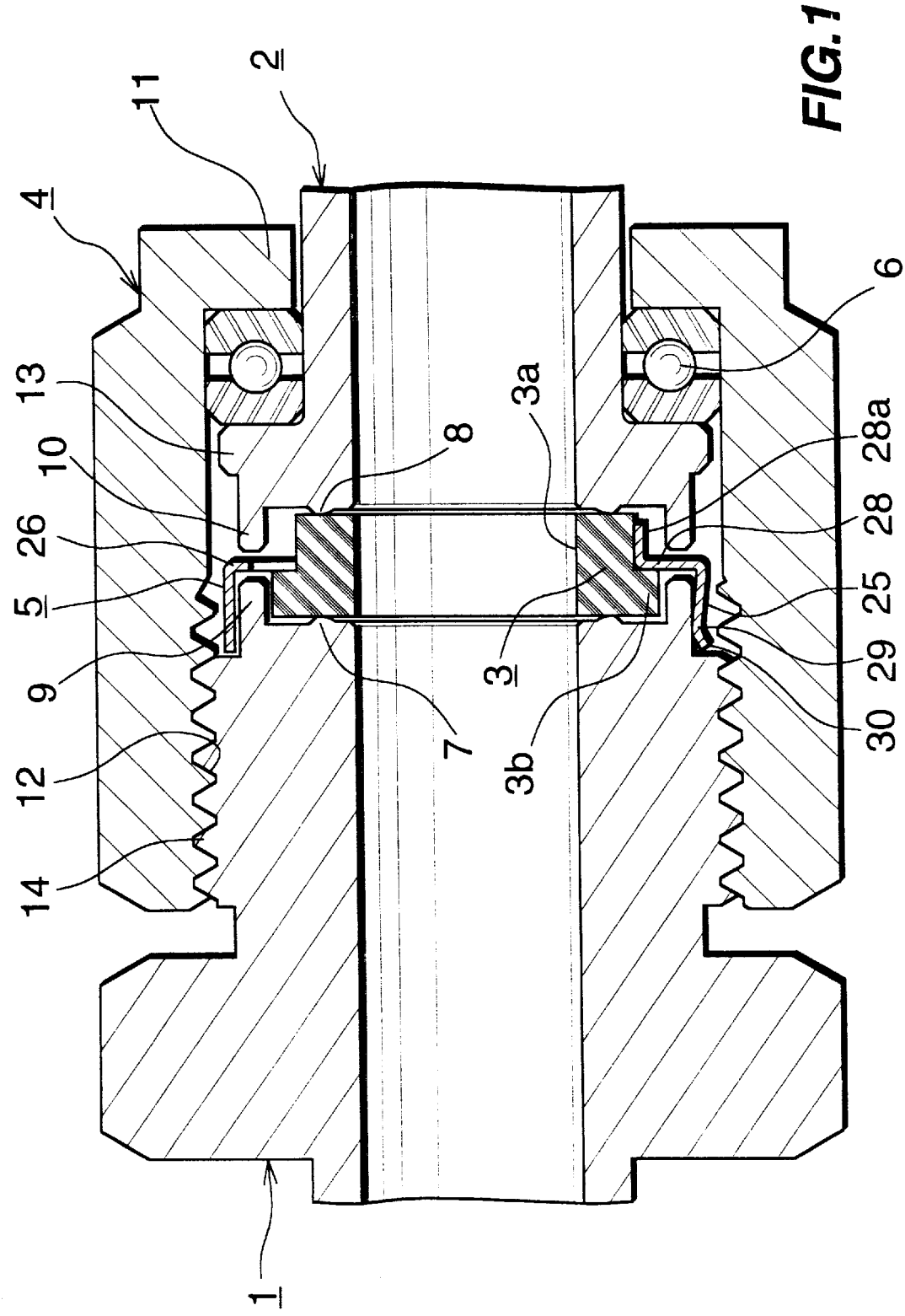
FIG. 1 is a view in longitudinal section showing a pipe joint embodying the invention.
Figure 2:
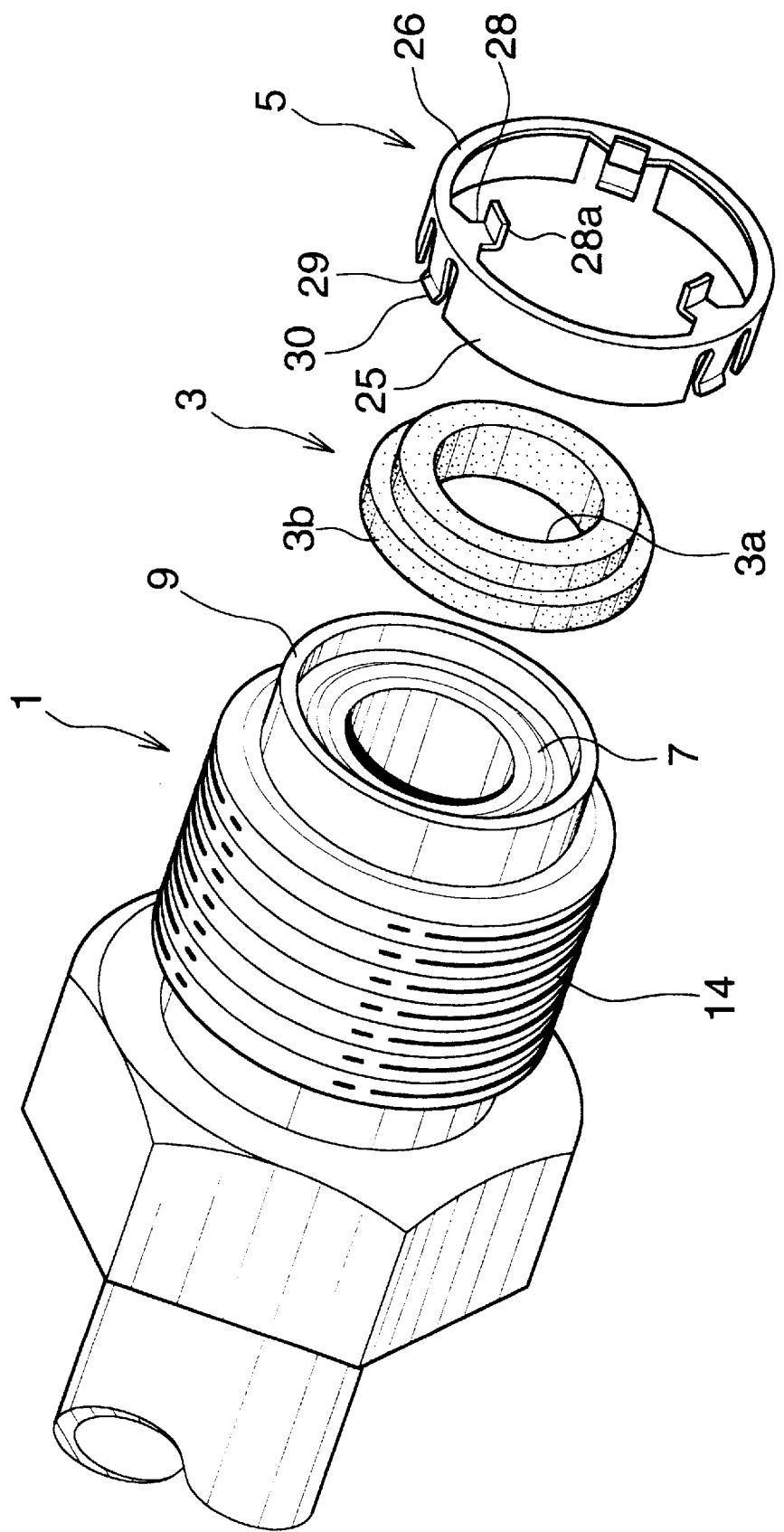
FIG. 2 is an exploded fragmentary perspective view of FIG. 1.

Referring to FIGS. 1 and 2, the pipe joint shown comprises a first tubular joint member 1, a second tubular joint member 2, an annular gasket 3 interposed between the right end face of the first joint member 1 and the left end face of the second joint member 2, and a retainer 5 holding the gasket 3 and held by the first joint member 1. The second joint member 2 is fastened to the first joint member 1 by a nut 4 provided on the member and screwed onto the first joint member 1. The abutting end faces of the respective joint members 1, 2 are formed, each on its approximate radial midportion, with annular seal projections 7, 8, respectively, and have annular overtightening preventing ridges 9, 10, respectively, at the outer peripheral portion of each member.

The gasket 3 has opposite flat end faces at right angles with the axis of the joint, and is provided on its outer periphery with a slipping-off preventing portion 3b in the form of an outer flange. This portion 3b makes it easy for the worker to cause the retainer 5 to hold the gasket 3 thereto and cause the joint members 1, 2 to hold the retainer 5 thereto.

The joint members 1, 2 and the gasket 3 are made of SUS 316L. The joint members 1, 2 have an inside diameter equal to the inside diameter of the gasket 3. A suitable stainless steel other than SUS 316L or other metal is usable for making the joint members 1, 2 and the gasket 3.

The retainer 5, which is integrally made from a stainless steel plate, comprises a ring portion 25, a gasket holding portion 26 having three claws 28 inwardly projecting from the right end of the ring portion 25 and adapted to hold the outer periphery of the gasket 3, and a joint member holding portion 29 engageable with the right end of the first joint member 1. The three claws 28 have slight resiliency. Each of the claws 28 has a rightwardly bent outer end to provide a bent lug 28a having slight resiliency. The gasket 3 is fitted to the inside of the claws 28 with the bent lug 28a in intimate contact with the gasket 3, whereby the gasket 3 inside the retainer 5 is prevented from moving radially and axially thereof. At the position where each of the three claws 28 is formed, the ring portion 25 has a pair of axial cutouts to provide a holding pawl 30. Three pawls 30 thus formed provide the joint member holding portion 29. The three holding pawls 30 resiliently grip the right end outer surface of the first joint member 1, whereby the retainer 5 is held to the first joint member 1. The claws 28 and the holding pawls 30 are not limited to three in number; four claws or pawls may be provided.

The nut 4 has an inner flange 11 formed at its right end and fitting around the second joint member 2. The nut 4 has at its left end an internally threaded portion 12, which is screwed on an externally threaded right portion 14 of the first joint member 1. The second joint member 2 has an outer flange 13 on the outer periphery of its left end. A thrust ball bearing 6 is interposed between the outer flange 13 and the inner flange 11 of the nut 4 for preventing the joint member 2 from rotating with the nut 4.

Figure 3:
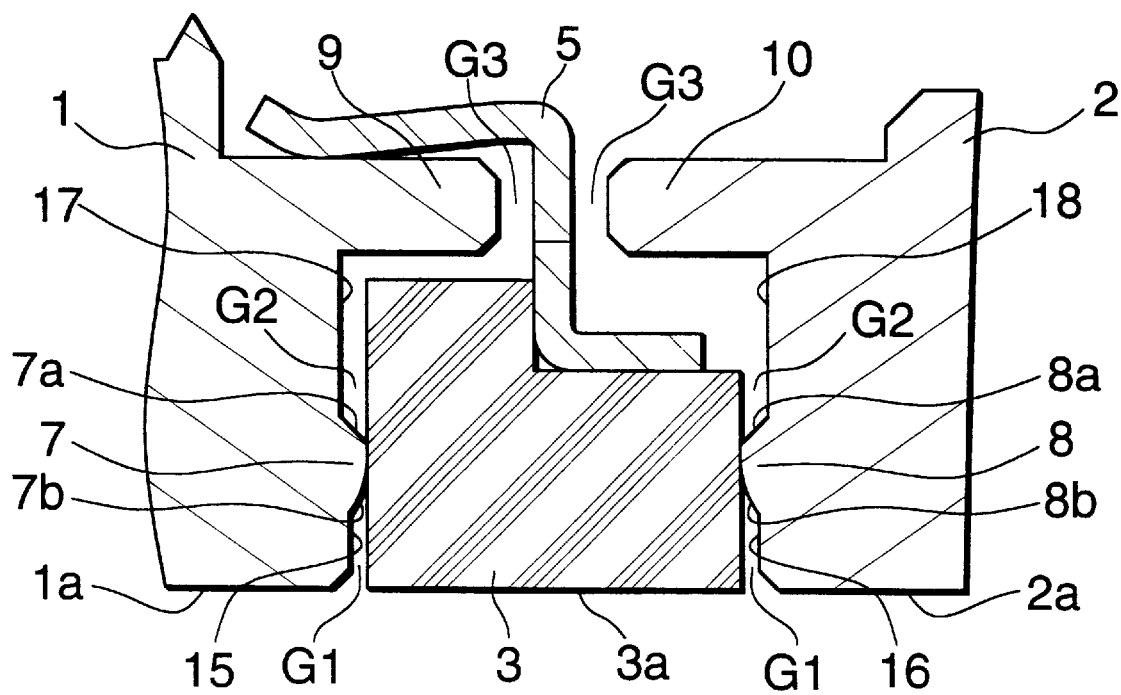
FIG. 3 is an enlarged fragmentary view in section of FIG. 1 showing the joint when a nut is tightened by hand.
Figure 4:
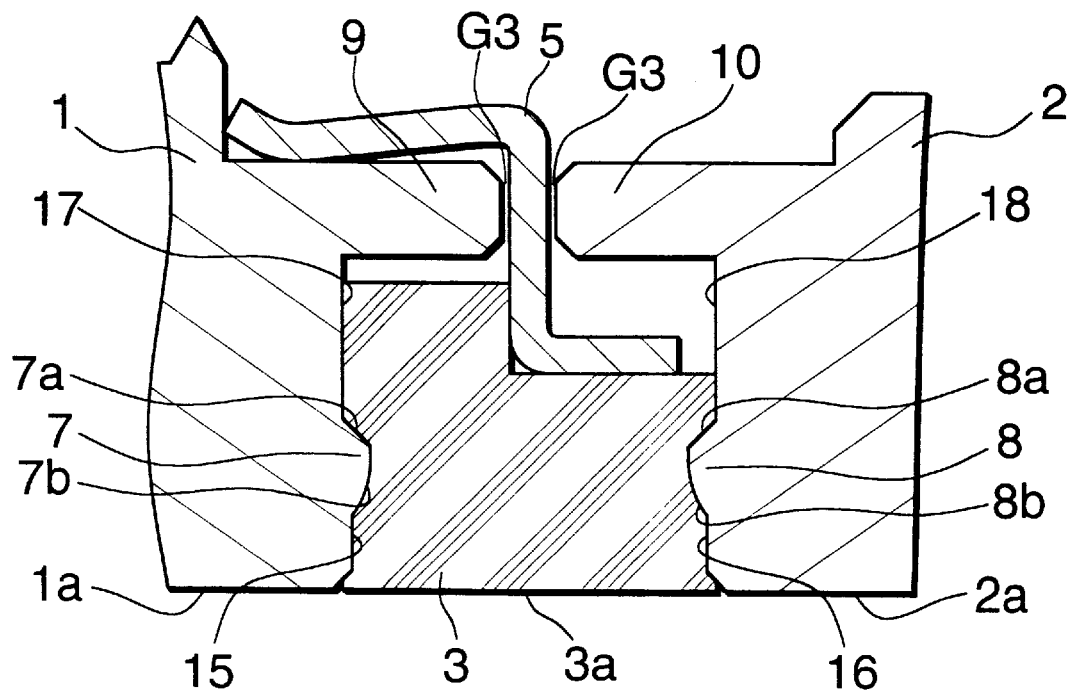
FIG. 4 is a view showing the joint when the nut is further tightened from the state of FIG. 3 and tightened up completely.

FIGS. 3 and 4 show the feature of the pipe joint of the invention in greater detail. Each of the seal projections 7, 8 has in section a contour which comprises a circular-arc portion 7b (8b) extending radially outward from the abutting end face of the joint member 1 (2), and a straight portion 7a (8a) extending from the circular-arc portion 7b (8b). The circular-arc portion 7b (8b) is in the form of a circular arc centered about a point positioned radially inward of the point of intersection of the circular-arc portion 7b (8b) and the straight portion 7a (8a). The straight portion 7a (8a) is inclined at 45 degrees with respect to the direction of axis of the joint.

Each of the abutting end faces includes an inner flat face 15 (16) and an outer flat face 17 (18) at the respective inner and outer sides of the seal projection 7 (8). The inner flat face 15 (16) is positioned axially closer to the gasket 3 than the outer flat face 17 (18).

The overtightening preventing ridges 9, 10 project rightward and leftward beyond the projections 7, 8, respectively, and are adapted to press the retainer 5 on opposite sides thereof when the nut 4 is to be tightened up more than is properly. These ridges 9, 10 protect the seal projections 7, 8 of the joint members 1, 2 from damage before assembling, obviating the serious influence to be otherwise exerted on the sealing properties.

FIG. 3 shows the pipe joint as tightened manually by the nut 4. As the nut 4 is tightened, the extremity of each of the seal projections 7, 8 first comes into contact with the end face of the gasket 3 opposed thereto as illustrated in the drawing. At this time, an inner clearance G1 is present between the inner flat face 15 (16) of the joint member 1 (2) and the left (right) end face of the gasket 3, and an outer clearance G2 greater than the clearance G1 exists between the outer flat face 17 (18) of the joint member 1 (2) and the left (right) end face of the gasket 3. There is a still greater clearance G3 between the overtightening preventing annular ridge 9 (10) and the retainer 5. Thus, G1<G2<G3. As the nut 4 is further tightened as by a wrench from the manually tightened state, the gasket 3 deforms, reducing the inner clearance G1 to zero. At this time, the outer clearance G2 is not zero. When the joint has been tightened up properly, the outer clearance G2 also diminishes to zero as shown in FIG. 4, the inner flat face 15 (16) comes into intimate contact with the inner peripheral portion of the left (right) end face of the gasket 3, and the inner periphery 1a (2a) of the joint member 1 (2) becomes substantially flush with the inner periphery 3a of the gasket 3. Consequently, no liquid trapping cavity remains. Even at this time, the clearance G3 between each annular ridge 9 (10) and the retainer 5 has not reduced to zero. When the nut 4 is further tightened, the clearance G3 between the ridge 9 (10) and the retainer 5 diminishes to zero, creating greatly increased resistance to tightening, whereby overtightening is prevented.

With the pipe joint described, the gasket 3 and the seal projections 7, 8 are so dimensioned as to eliminate the clearances G1, G2 between the gasket 3 and the seal projections 7, 8 when the tightening torque reaches the proper value. For example, the seal projections 7, 8 have a height of 0.1 mm from the respective inner flat faces 15, 16, and the circular arc is 0.5 mm in radius. The outer flat faces 17, 18 are recessed from the respective inner flat faces 15, 16 by 0.02 mm. When the nut 4 has been rotated by hand, the distance between the retainer 5 and the overtightening preventing ridges 9, 10 is 0.17 mm. The inner flat faces 15, 16 contact the gasket 3 when the nut 4, as manually rotated, is further rotated through 56.7 degrees, and the outer flat faces 17, 18 contact the gasket when the nut 4 is rotated through 68 degrees from the manually rotated position. The distance between the joint members 1, 2 as positioned by manual tightening decreases by 0.317 mm when the nut has been tightened through exactly 90 degrees eventually, causing the inner flat faces 15, 16 and the outer flat faces 17, 18 to bite into the gasket 3 by 0.06 mm and 0.04 mm, respectively. When the nut is further rotated through 5.7 degrees for tightening, the ridges 9, 10 come into contact with the retainer 5, whereby overtightening is precluded. The distance between the retainer 5 and the overtightening preventing ridges 9, 10 when the nut 4 is tightened by hand may be smaller than 0.17 mm, for example, 0.15 mm.

With the pipe joint of the invention, the frictional force against the axial movement of the gasket 3 relative to the first and second joint members 1, 2 is approximately equivalent to the corresponding force to be involved in the case where each seal projection has in section a circular-arc contour including no straight portion, so that the joint is free of the problem that the gasket 3 is difficult to separate from the joint members 1, 2 for disassembling.

Figure 5:
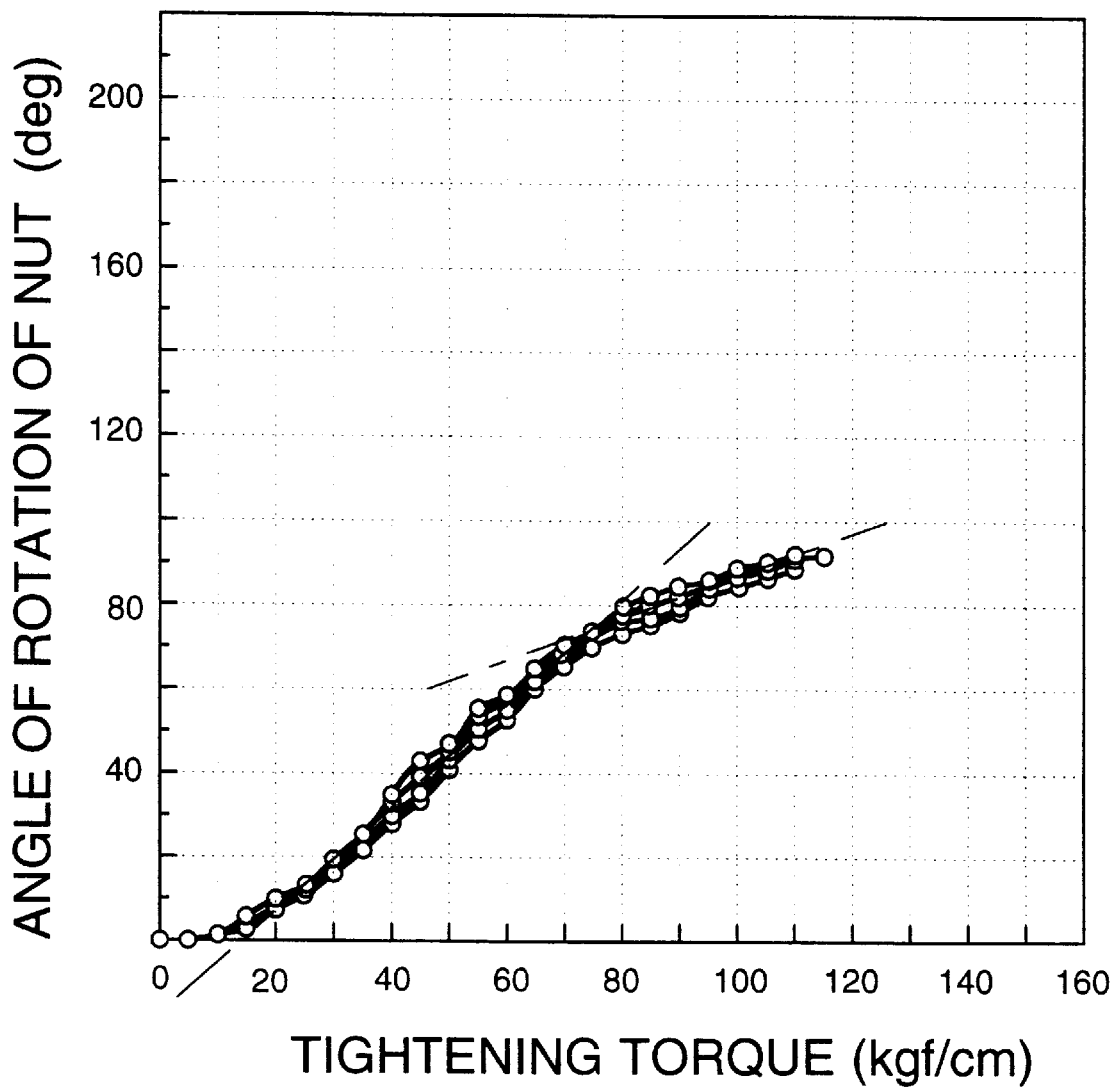
FIG. 5 is a graph showing the relationship between the angle of rotation of the nut and the tightening torque when the joint is tightened.

FIG. 5 shows the relationship between the angle of rotation of the nut 4 plotted as ordinate and the tightening torque as abscissa, as established for the pipe joint of the invention. The drawing reveals that the slope alters when the angle of rotation of the nut 4 is about 70 degrees. Stated more specifically, the increase of the tightening torque relative to the angle of rotation of the nut 4 is small and the graph is consequently steep until the outer flat faces 17, 18 contact the gasket 3. After the contact of the outer flat faces 17, 18 with the gasket 3, however, the area of contact of each joint member 1 (2) with the gasket 3 is great, resulting in a great increase in the tightening torque relative to the angle of rotation of the nut 4 and accordingly making the slope of the graph approach the horizontal, hence an apparent alteration in the slope when the angle of rotation of the nut 4 is about 70 degrees. When the seal projection has in section a circular-arc contour including no straight portion, the slope remains unaltered at an angle of rotation of the nut of about 70 degrees although not illustrated.

Table 1 shows the foregoing features of the invention as summarized. The table reveals that the present invention has overcome all the problems conventionally encountered.

TABLE 1

Figure 6:
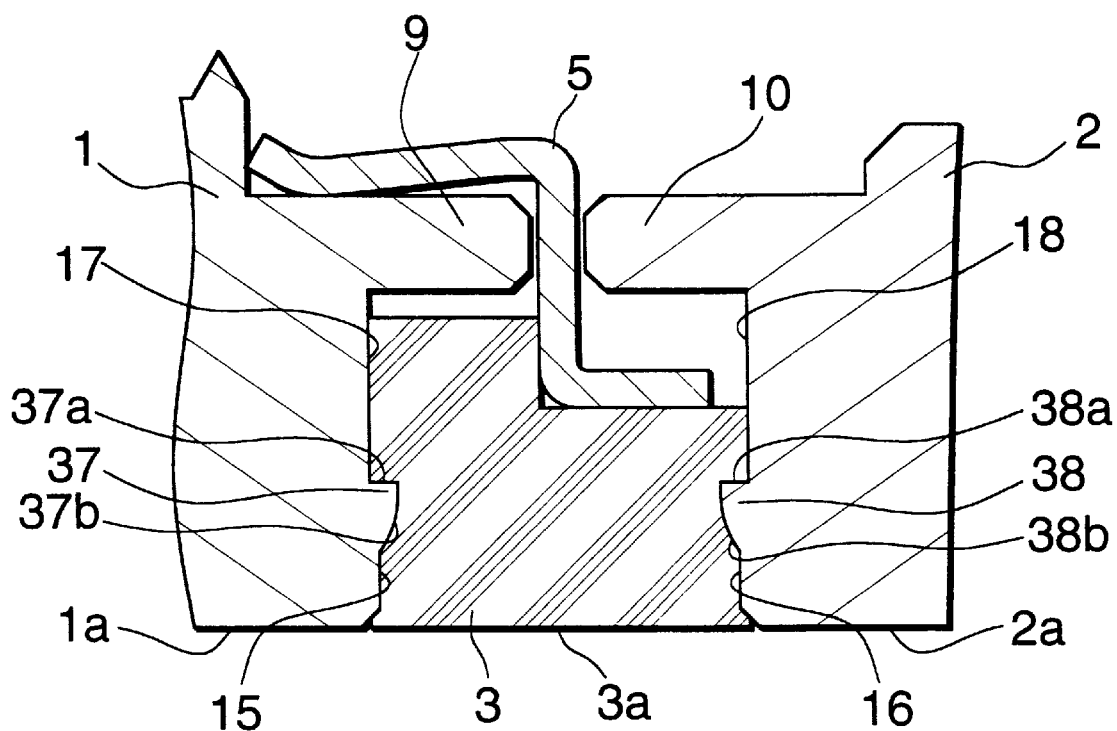
FIG. 6 is a view showing a conventional pipe joint as tightened up completely.

|  | Invention (see FIG. 4) | Comp. Ex. 1 (see FIG. 6) | Comp. Ex. 2 (not shown) |
| --- | --- | --- | --- |
| Shape of projection | Circular arc + inclined straight portion | Circular arc + axial straight portion | Circular arc only |
| Liquid trapping recess | None | None | None |
| Creasing of gasket inner periphery | No | No | No |
| Perceived reaction of tightening | Altered | Altered | Unaltered |
| Removal of gasket for disassembly | Smooth | Difficult | Smooth |

What is claimed is:

1. A pipe joint comprising a pair of tubular joint members, an annular gasket interposed between abutting end faces of the joint members and threaded means for joining the joint members, the abutting end faces of the joint members being formed with annular seal projections respectively, so that when the threaded means is completely tightened up, recesses corresponding to the respective seal projections are created in end faces of the gasket with respective inner peripheries of the abutting end faces of the joint members becoming approximately flush with an inner periphery of the gasket, the pipe joint being characterized in that each of the seal projections is positioned radially outward of the inner periphery of the abutting end face of the joint member and has in section a contour which comprises a circular-arc portion extending radially outward from the abutting end face, and a straight portion extending from the circular-arc portion, the circular-arc portion having a center positioned radially inward of the point of intersection of the circular-arc portion and the straight portion, the straight portion being inclined at 30 to 60 degrees with respect to the direction of axis of the joint.

2. The pipe joint of claim 1, wherein the gasket and the seal projections are dimensioned so as to eliminate any clearance between the gasket and the seal projections when a certain tightening torque value is achieved.

3. The pipe joint of claim 1, wherein the circular-arc portion is 0.5 mm in radius.

4. The pipe joint of claim 1, wherein the seal projections have a height of 0.1 mm from respective inner flat faces of tubular joint members.

* * * * *